United States Patent
Han et al.

(10) Patent No.: US 11,263,284 B2
(45) Date of Patent: Mar. 1, 2022

(54) METHOD AND SYSTEM FOR LOADING WEB PAGE, AND SERVER

(71) Applicant: Wangsu Science & Technology Co., Ltd., Shanghai (CN)

(72) Inventors: Tiantian Han, Shanghai (CN); Chen Li, Shanghai (CN); Kewei Huang, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 0 days.

(21) Appl. No.: 16/721,668

(22) Filed: Dec. 19, 2019

(65) Prior Publication Data
US 2020/0125623 A1 Apr. 23, 2020

Related U.S. Application Data

(63) Continuation of application No. PCT/CN2018/087675, filed on May 21, 2018.

(30) Foreign Application Priority Data

Apr. 25, 2018 (CN) .......................... 201810380713.3

(51) Int. Cl.
 G06F 16/957 (2019.01)
 G06F 16/9035 (2019.01)
 G06F 40/154 (2020.01)

(52) U.S. Cl.
 CPC ...... *G06F 16/9574* (2019.01); *G06F 16/9035* (2019.01); *G06F 16/9577* (2019.01); *G06F 40/154* (2020.01)

(58) Field of Classification Search
CPC ............. G06F 16/9574; G06F 16/9035; G06F 16/9577; G06F 40/154
See application file for complete search history.

(56) References Cited

U.S. PATENT DOCUMENTS 7,447,738 B1  11/2008 Andrews et al.
8,285,808 B1* 10/2012 Joel .................... G06F 16/9577
                                                                   709/213
(Continued)

FOREIGN PATENT DOCUMENTS

CN   101763357 A   6/2010
CN   102932358 A   2/2013
(Continued)

OTHER PUBLICATIONS

Wangsu Science & Technology Co., Ltd., Extended European Search Report, EP 18916420, dated Jan. 13, 2021, 8 pgs.

*Primary Examiner* — William L Bashore
*Assistant Examiner* — Gregory A Distefano
(74) *Attorney, Agent, or Firm* — USCH Law, PC

(57) ABSTRACT

Embodiments of the present disclosure relate to the Internet, and disclose a method and system for loading a web page, and a server. In the present disclosure, a method for loading the web page is applied to an edge server of a content delivery network, including: obtaining a loading list corresponding to a page according to a page loading request when the page loading request is received from a user terminal, and the loading list includes several add-ins to be loaded; identifying from a resource to be accelerated the add-ins to be loaded; rewriting the resource to be accelerated in the loading list according to a predetermined optimization scheme; and feeding back the rewritten loading list to the user terminal for the user terminal to request each add-in on the loading list to perform a page loading.

14 Claims, 3 Drawing Sheets

(56) References Cited

U.S. PATENT DOCUMENTS

| | | | |
|---|---|---|---|
| 9,607,322 B1* | 3/2017 | Boynes | G06Q 30/0277 |
| 10,027,777 B2* | 7/2018 | Chen | H04L 67/2847 |
| 2002/0007393 A1* | 1/2002 | Hamel | G06Q 30/0277 |
| | | | 709/203 |
| 2002/0145981 A1* | 10/2002 | Klinker | H04L 41/083 |
| | | | 370/244 |
| 2004/0254921 A1 | 12/2004 | Cohen et al. | |
| 2012/0066586 A1 | 3/2012 | Shemesh | |
| 2015/0046789 A1* | 2/2015 | Wei | G06F 16/9577 |
| | | | 715/234 |
| 2015/0082151 A1* | 3/2015 | Liang | G06F 40/154 |
| | | | 715/236 |
| 2020/0012695 A1* | 1/2020 | Esquivel | H04L 67/02 |

FOREIGN PATENT DOCUMENTS

| | | |
|---|---|---|
| CN | 103336702 A | 10/2013 |
| CN | 103561068 A | 2/2014 |
| CN | 103970770 A | 8/2014 |
| CN | 105045645 A | 11/2015 |
| CN | 105593840 A | 5/2016 |
| CN | 105701113 A | 6/2016 |
| CN | 107402937 A | 11/2017 |
| CN | 107402938 A | 11/2017 |
| CN | 107545058 A | 1/2018 |
| WO | WO 99/17227 A1 | 4/1999 |

\* cited by examiner

METHOD AND SYSTEM FOR LOADING WEB PAGE, AND SERVER

CROSS-REFERENCE TO RELATED APPLICATIONS

The present application is a continuation of PCT Patent application No. PCT/CN2018/087675, entitled "METHOD AND SYSTEM FOR LOADING WEB PAGE, AND SERVER" filed on May 21, 2018, which claims priority to Chinese Patent Application No. 201810380713.3, filed Apr. 25, 2018, each of which is incorporated herein by reference in its entirety.

TECHNICAL FIELD

The present disclosure relates to the Internet, in particular, to a web page loading acceleration technology.

BACKGROUND

A script is an extension of a batch file, and is a program saved in plain text. Generally speaking, a computer script program is a combination of a series of determined operations that control a computer to perform arithmetic operations, where certain logical branches may be performed. One page contains multiple elements such as HTML, JavaScript (JS), Cascading Style Sheet (CSS), a picture and so on. Take JS for example, in a working mode of a browser, the browser needs to stop and wait for the script to complete execution before completing drawing the page when encountering a script by default. This means that the files are loaded and executed one by one, which may affect the execution time of the browser. If the page architecture is unreasonable and the JS script is in forward position, a JS loading speed may affect the loading effect of an overall website.

When the JS script is being executed, both downloading and rendering of the page have to stop to wait for completion of execution of the script. An inappropriate loading sequence may block a large quantity of element requests, thereby leading to longer loading time of the page. Concerning optimization of the loading sequence of requests, a main method in the existing technologies is to modify a website structure and adjust the loading sequence, so as to improve the speed at which the page is presented to a user. However, the inventor found that at least the following problems exist in the existing technologies: on the one hand, modification of the website structure can only be performed by an obligee of the web page which is accessed, while a visitor accessing the web page has no right to modify it. On the other hand, a third-party JS file on the web page is uncontrollable and can not be modified.

SUMMARY

Embodiments of the present disclosure aim to provide a method and a system for loading a web page, and a server, so that it is unnecessary to modify codes of an origin site during a process of optimizing the loading of the web page, thereby reducing time of technical development by an owner of the website while optimizing user experience and facilitating popularization.

In order to solve the above technical problem, embodiments of the present disclosure provide a method for loading a web page, applied to an edge server of a content delivery network, including: obtaining a loading list corresponding to a page according to a page loading request when the page loading request is received from a user terminal, and the loading list includes several add-ins to be loaded; identifying a resource to be accelerated from the add-ins to be loaded; rewriting the resource to be accelerated in the loading list according to a predetermined optimization scheme; and feeding back the loading list that is rewritten to the user terminal for the user terminal to request each add-in to be loaded on the loading list to perform a page loading.

Embodiments of the present disclosure further provide a server, including: at least one processor; and a memory communicably connected to the at least one processor; where the memory stores instructions executable by the at least one processor, and the instructions are executed by the at least one processor to cause the at least one processor to perform the method for loading the web page as described above.

Embodiments of the present disclosure further provide a system for loading a web page, including: a user terminal and the server as described above.

Embodiments of the present disclosure further provide a computer readable storage medium, storing a computer program which, when executed by a processor, performs the method for loading the web page as described above.

Compared with the existing technologies, embodiments of the present disclosure have the following differences and effects: the edge server of the content delivery network optimizes a loading mode of the add-ins to be loaded by rewriting the loading list fed back to the user terminal which then requests each add-in to be loaded according to the loading list that is rewritten, so as to rapidly obtain the add-ins to be loaded that may be displayed, such as pictures, words and the like, so that the page escapes from being blank and the user may see the accessed page as soon as possible, thereby improving user experience of accessing the website. Besides, that embodiments of the present disclosure are performed by a content delivery network creatively improves a given network optimization mode in this industry, which does not require modifying a configuration of the user terminal, codes of the origin site, or a network architecture of the origin site of the page to be accessed, and has good compatibility. And time of technical development used by the owner of the web site can be reduced, better network experience can be provided to a user terminal side, and popularization of embodiments of the present disclosure can be facilitated. Besides, the server in the embodiments of the present disclosure may be an edge server under the content delivery network (CDN) architecture, so a cloud provider may optimize a loading mode more effectively, automatically and intelligently based on a network environment such as a terminal loading condition.

As a further improvement, a predetermined optimization scheme at least includes one of: an asynchronous rewriting scheme, an acceleration rewriting scheme and a shielding rewriting scheme. Multiple optional optimization schemes are further defined, so that the resource to be accelerated is better optimized.

As a further improvement, in rewriting the resource to be accelerated in the loading list according to the predetermined optimization scheme, the predetermined optimization scheme is determined by a preset strategy; where the preset strategy is that: a corresponding optimization scheme is the asynchronous rewriting scheme if the resource to be accelerated is a script file that meets a first preset condition; the corresponding optimization scheme is the acceleration rewriting scheme if the resource to be accelerated belongs to a third-party external link, where the third-party external link is a link that does not belong to a customer; the corresponding optimization scheme is the shielding rewriting scheme if the resource to be accelerated belongs to a preset blacklist. It is further defined that a preset strategy is provided, it is thus seen that multiple optimization schemes may be performed separately or in combination, and a more proper optimization scheme for different resources to be accelerated may be configured as required.

As a further improvement, it is determined through domain name identification that the resource to be accelerated belongs to the third-party external link. An identification mode of a third-party external link is further defined, so that the identification of the resource to be accelerated is more accurate and a determined optimization scheme is more appropriate.

As a further improvement, the preset strategy is configured by the customer. It is further defined that the preset strategy is configured by the customer, which facilitates adjusting the preset strategy based on actual demands so that the strategy is more suitable for the customer' demands.

As a further improvement, the loading list includes a loading sequence of each add-in to be loaded; and rewriting the resource to be accelerated in the loading list according to the predetermined optimization scheme, including: rewriting the loading sequence of a script file that meets a first preset condition in the loading list when the predetermined optimization scheme is the asynchronous rewriting scheme. This further defines it is the loading sequence of the script file that is rewritten in the asynchronous rewriting scheme, which further accelerates a user browser side's escaping from being blank.

As a further improvement, rewriting the loading sequence of the script file that meets the first preset condition in the loading list includes: rewriting the loading sequence of the script file that meets the first preset condition in the loading list by modifying a type tab of the script file that meets the first preset condition. It is further defined that rewriting the loading sequence by modifying the type tab of the script file, which is easy to be realized, simple and less error-prone.

As a further improvement, rewriting the resource to be accelerated in the loading list according to the predetermined optimization scheme includes: adding identification information to a specific position of a request address corresponding to the resource to be accelerated when the optimization scheme is the acceleration rewriting scheme; and after feeding back the loading list that is rewritten to the user terminal, further including: receiving the loading request for each add-in to be loaded from the user terminal, and sending the loading request to a target site; where, a preferred network node is used to send the loading request for the resource to be accelerated that contains the identification information if the loading request that is received includes the identification information. It is further defined that rewriting by adding the identification information in the acceleration rewriting scheme and using the preferred network node to send the loading request to the target site when subsequently requesting the add-ins to be loaded, so as to accelerate the loading speed of the add-ins to be loaded, thereby further accelerating the speed of accessing the web page.

As a further improvement, rewriting the resource to be accelerated in the loading list according to the predetermined optimization scheme includes: adding a stop identifier to a specific position of a request address corresponding to the resource to be accelerated when the optimization scheme is the shielding rewriting scheme; and after feeding back the loading list that is rewritten to the user terminal, further including: receiving the loading request for each add-in to be loaded from the user terminal, and sending the loading request to a target site; where, a stop-loading instruction for the resource to be accelerated that contains the stop identifier is returned if the loading request that is received includes the stop identifier. It is further defined that adding the step identifier to the add-ins to be loaded in the shielding rewriting scheme, so as to directly return the stop instruction when subsequently requesting loading the add-ins to be loaded, skip the loading of the add-ins to be loaded, and avoid an unnecessary waste of time, thereby accelerating a loading speed of a page.

As a further improvement, embodiments of the present disclosure further includes: locally storing the loading list when the loading list corresponding to the page is obtained according to the loading request. It is further defined that locally backing up the loading list after the loading list is requested and obtained, so that there is no need to obtain the loading list again when subsequently requesting, which accelerates a speed of requesting the list, thereby accelerating a loading process of an entire page.

As a further improvement, before identifying the resource to be accelerated from the add-ins to be loaded, embodiments of the present disclosure further includes: determining whether to use an optimization service, and performing the step of identifying the resource to be accelerated from the add-ins to be loaded when it is determined to use the optimization service. It is further defined that there is an entry determination in the optimization process of loading the entire page, and the entry is carried out only when it is determined that the optimization is needed, so that embodiments of the present disclosure are more suitable for actual conditions.

BRIEF DESCRIPTION OF THE DRAWINGS

One or more embodiments are described as examples with reference to the corresponding figures in the accompanying drawings, and the examples do not constitute limitations to the embodiments. Elements with the same reference numerals in the accompanying drawings represent similar elements. The figures in the accompanying drawings do not constitute proportion limitations unless otherwise stated.

DETAILED DESCRIPTION

Figure 1:
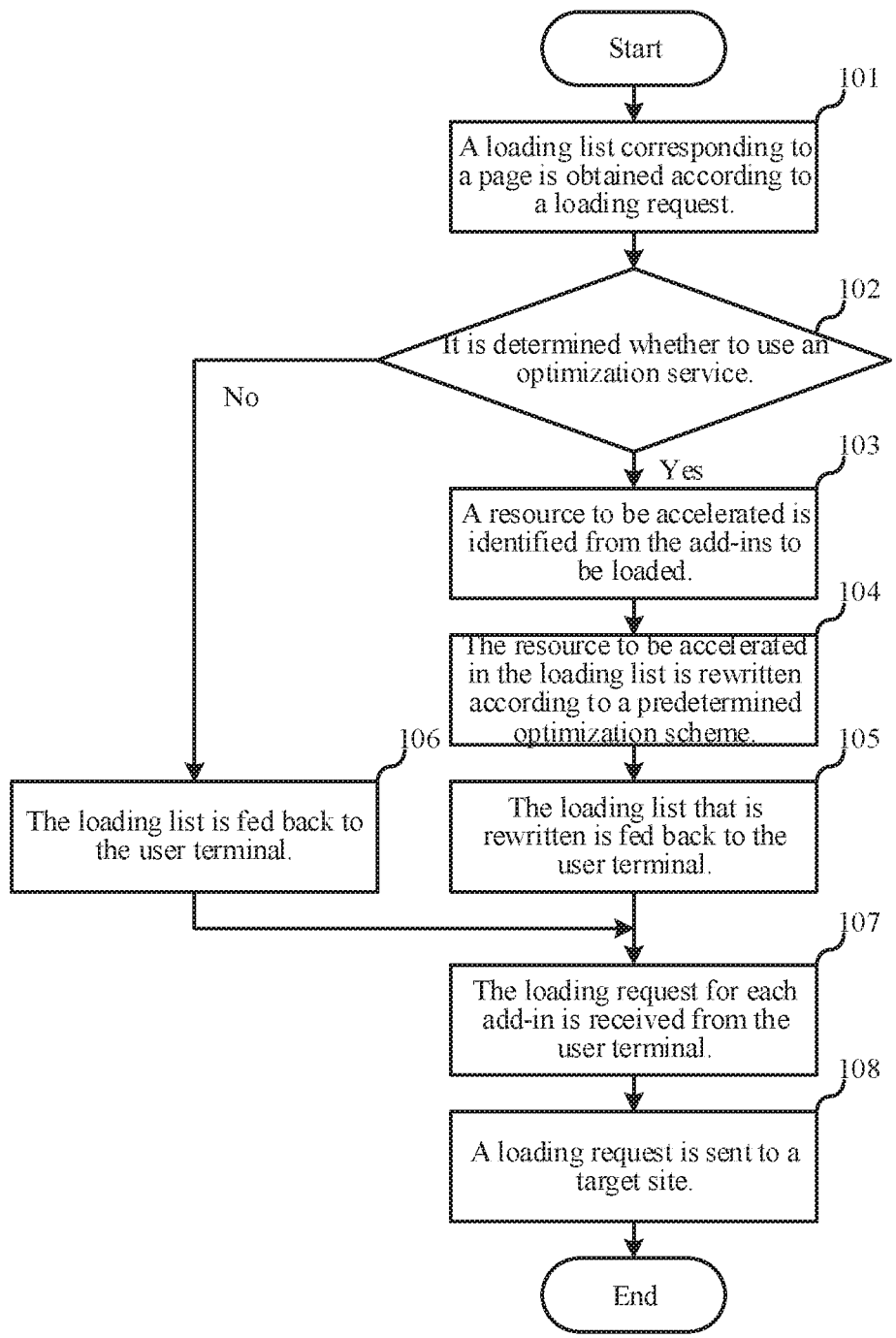
FIG. 1 is a flowchart of a method for loading a web page according to a first embodiment of the present disclosure.

The embodiments of the present disclosure will be described in detail below with reference to the accompanying drawings in order to make the objectives, technical solutions and advantages of the present disclosure clearer. However, those skilled in the art may understand that numerous technical details are set forth in the various embodiments of the present disclosure in order to provide the reader with a better understanding of the present disclosure. However, the technical solutions claimed in the present disclosure may also be implemented without these technical details and various changes and modifications based on the following embodiments.

A first embodiment of the present disclosure relates to a method for loading a web page.

This embodiment may be applied to a server, specifically, an edge server under a CDN architecture (e.g., an acceleration cloud platform). A distributed computer system in the existing technologies is a "content delivery network" or "CDN" operated and managed by a service provider. The service provider generally provides the content delivery service on behalf of third parties (e.g., customers) who use the service provider's infrastructure. A distributed system of this type generally refers to a connection of autonomous computers linked by one or more networks, together with the software, systems, protocols, and technologies designed to facilitate various services, such as content delivery, web application acceleration, or other support of outsourced origin site infrastructure. A CDN service provider generally provides service delivery through digital properties (such as a website) which is provisioned in a customer portal and then deployed to a network. A digital property is generally bound to one or more edge configurations to allow the service provider to account for traffic and bill its customer. An overlay network such as described above may incorporate or interoperate with a Front-End Optimization (FEO) scheme. The FEO is the process of accelerating web pages by modifying the HTML and resources on them. The goal is to eliminate bottlenecks and inefficiencies in front-end of a site that is using the overlay. In the FEO, a plurality of specific optimizations may be employed, and they aim to do one or more of the following: reduce the number of HTTP requests required to load the page, instead of downloading more data in one request; reduce a total size of the web page and its parts by using more efficient formats so as to improve cache-capability and remove unnecessary contents; and accelerate rendering by making the browser load the add-ins to be loaded in different sequences or timing, e.g., the third-party script is prevented from delaying everything else on the page.

Specifically, in a known overlay network system, the distributed computer system is configured as the CDN and is assumed to have a set of machines $1^2a$-$n$ distributed around the Internet. Generally, most of the machines are servers located near the edge of the Internet, i.e., at or adjacent end users access networks. A network operations command center (NOCC) manages operations of various machines in the system. Third-party sites, such as website, offload delivery of contents (e.g., HTML, embedded page objects, streaming media, software downloads, and the like) to the distributed computer system, in particular, to "edge" servers. Generally, content providers offload their content delivery by aliasing (e.g., by a DNS CNAME) given content provider domains or subdomains to domains that are managed by authoritative domain name service of the service provider. The end users that desire the content are directed to the distributed computer system to obtain that content more reliably and more efficiently. Although not shown in detail, the distributed computer system may also include other infrastructure, such as a distributed data collection system that collects usage and other data from the edge servers, aggregates that data across a region or set of regions, and passes that data to other back-end systems to facilitate monitoring, logging, alerts, billing, management and other operational and administrative functions.

A flow of a method for loading a web page in this embodiment is shown in FIG. 1, which is specifically as follows.

In step 101, a loading list corresponding to a page is obtained according to a loading request.

Specifically, in this step, the loading list corresponding to the page is obtained according to the loading request when a page loading request from a user terminal is received. More specifically, the page loading request may be sent when the user loads the web page through a browser, or when the user is viewing a certain page of an application (i.e., "APP").

It should be noted that the loading list (i.e., an HTML file) includes add-ins to be loaded and a loading sequence of each add-in of the page. Besides, the loading list may be pre-stored on a local server, and the loading list may also be mirrored to the local server even if the actual location of a server to which the web page belongs is far away, so that the pre-stored loading list may be directly fed back to the user terminal for the user' browser to perform a subsequent operation when the web page loading request is received. In practice, the loading list corresponding to the page to be accessed may also not be pre-stored on the local server. As a result, the server may request the loading list from an origin site of the web page and then feed it back to the user terminal. Besides, a local storage step is added to locally store the loading list described above when obtaining the loading list.

The processing of the edge server for requests from the user terminal is described in detail in the following according to an implementation in practice. An overlay network customer is provisioned to use the FEO service using the customer total, and CDN edge servers are provided configuration data indicating that FEO should be applied to the customer's site (or some portions thereof). A first user request (i.e., a loading request of a page) is then received at the edge server. An edge server global host (GHost) process applies its configuration data and determines that this request should use FEO. It then looks up the normalization information for this digital property. In one embodiment, the GHost process communicates with the FEO network using RESTful requests and data is exchanged in an API (e.g., a Google protocol buffer). The API responds to the request for normalization by performing a database lookup for this digital property and returns the information. The responses to the RESTful requests are cached. A second user request is then received at the edge server GHost process, which then applies configuration and determines that this request should use the FEO. The GHost process then looks up the normalization information for this customer, and this information is now present.

In step 102, it is determined whether to use an optimization service; if yes, a step 103 is performed; or if not, a step 103 is performed.

Specifically, it is determined whether to use the optimization service according to a URL, where the URL refers to a request address in the page loading request. In practice, this step may be applied to determine whether a customer purchases the optimization service. If yes, a following optimization process is performed; or if not, a following rewriting step is not performed, but the loading list is directly fed back to the user terminal.

In step 103, a resource to be accelerated is identified from the add-ins to be loaded.

Specifically, the resource to be accelerated may be a JS script, and further, may be a third-party JS script, and further, may be an external link. In practice, a condition for identification may be set by customers and is not limited herein.

More specifically, during implementation, the user terminal determines whether the resource to be accelerated is a script through a <script> tab, for example, a JS script. In this step, it may be determined whether the resource to be accelerated is the JS script and whether it is the external link and the like according to a src tab.

Due to that the JS may affect such conditions as a document object model (DOM) and style of the page when being executed, a user browser may stop analyzing the following HTML if the script tab of a file to be downloaded is being analyzed when analyzing and rendering the HTML. Then an external link JS file is downloaded and performed. The rest of the HTML may not be analyzed until implementation of the JS is completed, which is the so-called "JS congestion".

In step 104, the resource to be accelerated in the loading list is rewritten according to a predetermined optimization scheme.

Specifically, the predetermined optimization scheme at least includes one of: an asynchronous rewriting scheme, an acceleration rewriting scheme and a shielding rewriting scheme. More specifically, in rewriting the resource to be accelerated in the loading list according to the predetermined optimization scheme, the predetermined optimization scheme is determined by a preset strategy. Where, in the preset strategy, each resource to be accelerated may be specified to use a certain optimization scheme, or different optimization schemes may be specified to use different resources to be accelerated. Additionally, in practice, apart from the three optimization schemes described above, other optimization schemes may be added as required, and a number and content of the optimization schemes is not limited herein.

In step 105, the loading list that is rewritten is fed back to the user terminal.

Specifically, the loading list fed back to the user terminal may allow the user terminal to request each add-in to be loaded in the loading list to perform page loading. In practice, the loading list carries request addresses of each add-in to be loaded, so that the user terminal may directly request each add-in to be loaded from the origin site. More specifically, the user terminal does not need to know whether the loading list that is received is rewritten or not, but still requests the add-ins to be loaded one by one according to each add-in to be loaded listed on the loading list that is received and its loading sequence. Then a step 107 is performed.

In step 106, the loading list is fed back to the user terminal.

Specifically, in this step, the loading list obtained in step 101 is fed back to the user terminal, but the loading list is not rewritten. By combining this step with step 102, feedback of the loading list may be completed when it is unnecessary to use the optimization service. Then a step 107 is performed.

In step 107, the loading request for each add-in to be loaded is received from the user terminal.

Specifically, the user terminal may request each add-in to be loaded in the loading list one by one according to the loading sequence after receiving the loading list. Because the loading list stores request addresses of each add-in to be loaded, the respective loading requests also carry request addresses.

In step 108, the loading request is sent to a target site.

Specifically, the server sends the loading request to the target site, where the target site is the origin site to which the web page to be accessed belongs. It should be noted that the server may directly forward the loading request that is received to the target site, or may send the loading request to the target site using a preferred network node. Where, an IP and a port of the origin site are determined through an IP and port information that have been monitored, and an optimal path between the user terminal and the origin site is then determined through an intelligent routing device.

Compared with the existing technologies, this embodiment has the following differences and effects: the edge server of the content delivery network optimizes a loading mode of the add-ins to be loaded by rewriting the loading list fed back to the user terminal which then requests each add-in to be loaded according to the loading list that is rewritten, so as to rapidly obtain the add-ins to be loaded that may be displayed, such as pictures, words and the like, so that the page escapes from being blank and the user may see the accessed page as soon as possible, thereby improving user experience of accessing the website. Besides, that this embodiment of the present disclosure is performed by a content delivery network creatively improves a given network optimization mode in this industry, which does not require modifying a configuration of a user terminal, codes of the origin site, or a network architecture of the origin site of the page to be accessed, and has good compatibility. And time of technical development used by the owner of the website can be reduced, better network experience can be provided to a user terminal side, and popularization of this embodiment can be facilitated. Besides, the server in this embodiment of the present disclosure may be an edge server under the content delivery network (CDN) architecture, so a cloud provider may optimize a loading mode more effectively, automatically and intelligently based on a network environment such as a terminal loading condition.

A second embodiment of the present disclosure relates to a method for loading a web page, which is a further development on the basis of the first embodiment. The second embodiment is improved in that: a preset strategy is added in the second embodiment to be used for determining an optimization scheme for each resource to be accelerated, automatic recognition of the resources to be accelerated is realized, and more suitable optimization schemes are configured for the resources to be accelerated as required.

Figure 2:
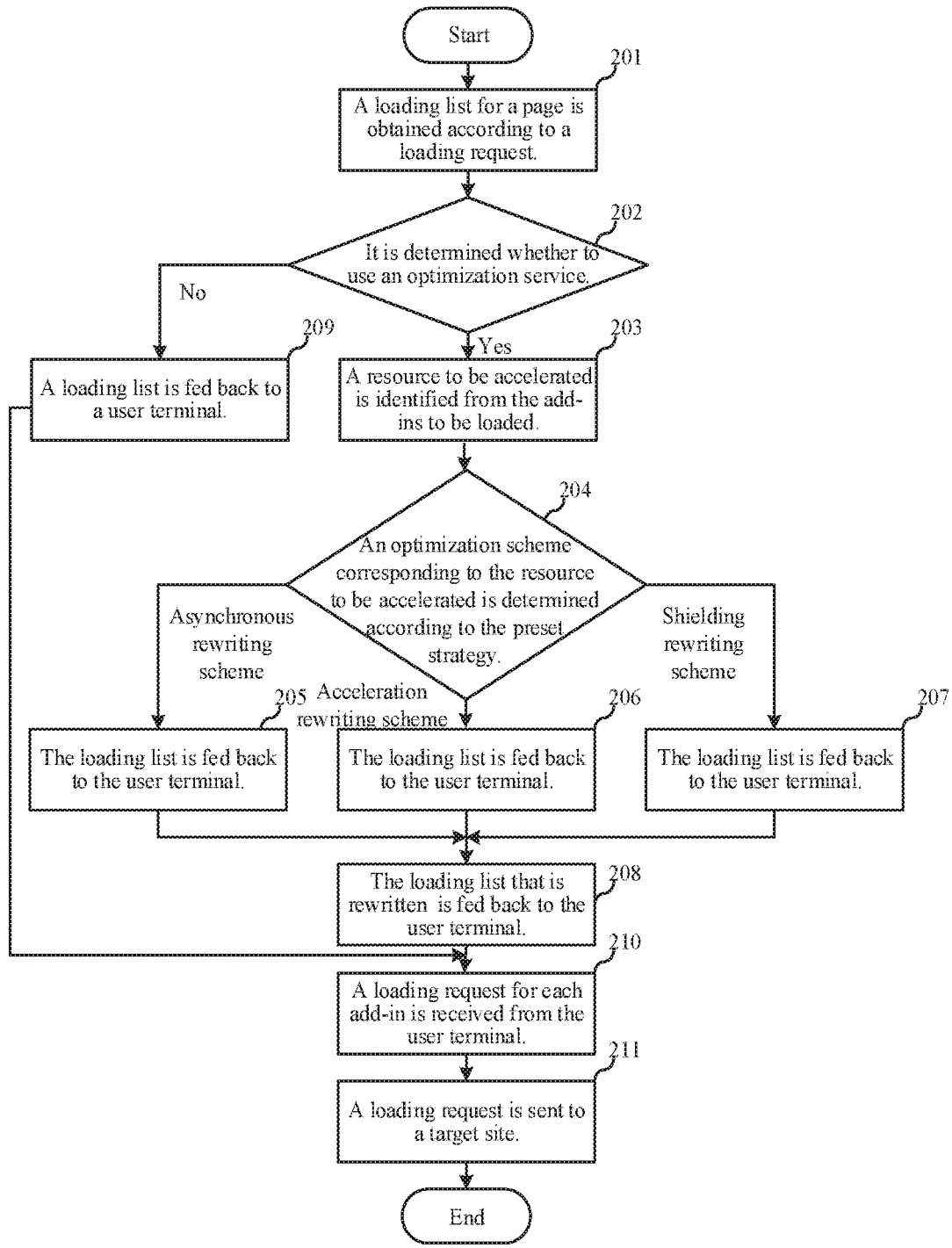
FIG. 2 is a flowchart of a method for loading a web page according to a second embodiment of the present disclosure.

The method for loading the web page in this embodiment is shown in FIG. 2, which is specifically as follows.

Steps 201 and 203 are similar to steps 101 and 103 in the first embodiment respectively and thus will not be repeated herein.

In step 202, it is determined whether to use an optimization service; if yes, a step 203 is performed; or if not, a step 209 is performed.

Specifically, a determination mode in this step is similar to step 102 in the first embodiment and thus is not repeated.

In step 204, it is determined which optimization scheme the resource to be accelerated corresponds to according to the preset strategy; a step 205 is performed if it is an asynchronous rewriting scheme; a step 206 is performed if it is an acceleration rewriting scheme; and a step 207 is performed if it is a shielding rewriting scheme.

Specifically, the preset strategy in this step includes the following three aspects:

(1) A corresponding optimization scheme is the asynchronous rewriting scheme if the resource to be accelerated is a script file that meets a first preset condition; where, the first preset condition may be a JS script, and further, may be a third-party JS script, and further, may be an external link.

(2) The corresponding optimization scheme is the acceleration rewriting scheme if the resource to be accelerated belongs to a third-party external link. Specifically, the resource to be accelerated may be determined as belonging to the third-party external link through domain name recognition. More specifically, the third-party external link is a link that does not belong to a customer.

(3) The corresponding optimization scheme is the shielding rewriting scheme if the resource to be accelerated belongs to a preset blacklist. Where, the blacklist may include add-ins to be loaded that are blocked by a firewall. Due to policy influence at national level, some add-ins to be loaded can not be loaded objectively. Therefore, the shielding rewriting scheme may be used to perform optimization so as to avoid an unnecessary loading attempt.

It should be noted that though it is set in the strategy of this embodiment that each resource to be accelerated only corresponds to one optimization scheme. In practice, however, it may be configured that multiple optimization schemes may be combined if an acceleration resource meets more than one of the conditions described above. It is seen that the preset strategy may be voluntarily configured by the customer and thus is not limited herein.

In step 205, a loading sequence of the script file that meets the first preset condition in the loading list is rewritten.

Specifically, because downloading of the script file (especially an uncontrollable third-party JS script file) may hinder downloading of other add-ins to be loaded, steps, such as drawing, displaying and the like, may not be performed if a location of the JS script is unreasonable and downloading of the script file has not been completed, thus the page to be accessed will remain blank.

In this embodiment, the loading sequence of the script file that meets the first preset condition in the loading list is rewritten by modifying a type tab of the script file that meets the first preset condition. Further, the type tab may be modified by inserting a piece script, and a function of the script file may be to rewrite the type tab of the script file in the loading list. The script file that meets the first preset condition may be the JS script.

It should be noted that the inventor of the present disclosure found that the page may be required to wait for analyzation and execution of the script during execution of the script, and downloading and rendering of the page have to stop to wait for completion of execution of the script whether a current Javascript is embedded or contains an external link file. That is, the sequence of loading the JS script file may be modified if a script element is created dynamically and added to the end of an HTML file through a document object model (DOM) tree. That is, a sequence of the JS script is modified to the end in the loading sequence of the loading list.

It should also be noted that the above-mentioned modifying the type tab of the script file may be realized by inserting a part of script file in practice. A specific script tab may be rewritten first when the script file is being executed. In this way, the user terminal may ignore this part of the script file upon execution, and then the script file that is ignored may be executed again after loading of all other add-ins to be loaded is completed.

The inventor of the present disclosure tests the effect in practice, and the result is that most websites have reduced time for loading a first page and acceleration of the first page is improved more than 50%.

In step 206, identification information is added to a specific position of a request address corresponding to the resource to be accelerated.

Specifically, the third-party external link refers to a link that is provided by other service providers (which is uncontrollable to the content producer) who decorate their service into JS SDK for the web page producer to use.

From the web page producer's point of view, the third-party JS is distinguished from a first-party JS in that:
1. downloading speed is uncontrollable;
2. a JS address domain name is different from a website domain name;
3. file content is uncontrollable;
4. a caching rule (Cache-Control/Expires) is not necessarily available.

If there are a plurality of third-party JS codes on the website, "downloading speed being uncontrollable" may probably result in slowing down of the website.

Specifically, the identification information may be such information as a customer name, a customer domain name, or the like, and may further be a specific identification number and the like. The content of the identification information may be set according to actual demands, which is not limited herein. The specific position may be the end of the request address (URL) in practice.

In step 207, a stop identifier is added to a specific position of a request address corresponding to the resource to be accelerated.

Specifically, the stop identifier may be a predetermined identifier, and a position for adding the stop identifier may be the end of the request address (URL). In practice, a form and a specification position of the stop identifier may be set according to actual demands, which is not limited herein.

It should be noted that a specific position for adding the step identifier and a specific position for adding identification information in step 206 may be either the same or different, for which no more examples will be provided herein.

The steps 205, 206 and 207 described above are particular methods for rewriting the loading list, and after execution of each of them is completed, a step 208 is performed. Because steps 208 to 210 are similar to steps 105 to 107 in the first embodiment, steps 208 to 210 are not presented herein. Besides, it should be noted that after execution of each of steps 208 and 209 is completed, a step 210 is then performed.

In step 211, the loading request is sent to a target site.

Specifically, in step 210, a plurality of or a group of loading requests may be received at the same time when the loading request is received, and the loading request needs to be analyzed before being sent.

Concrete analyses are as follows: the loading request may be sent for the resource to be accelerated that contains the identification information using a preferred network node if identification information exists. It is thus seen that, in this way, the third-party external link may be accelerated. A stop-loading instruction for the resource to be accelerated that contains the stop identifier is returned to the user terminal if a stop identifier exists, so as to prevent the user terminal from reloading the resource to be accelerated. In practice, the error "403" may also be returned. That is, the error "403" may be returned for the URL blocked by the firewall. Then, each loading request may be sent to the target site (e.g., an origin site server).

Accordingly, this embodiment further defines that a preset strategy is provided. It is thus seen that multiple optimization schemes may be performed separately or in combination, and a more proper optimization scheme may be configured for different resources to be accelerated as required. Besides, an automatic identification for each resource to be accelerated may be realized to save labor. Further, in this embodiment, implementations of three preferred optimization schemes are detailed from different methods for rewriting the loading list to subsequently request the add-ins to be loaded, so as to make solutions of the present embodiment clear, effective, simple, easy and advantageous for popularization.

Figure 3:
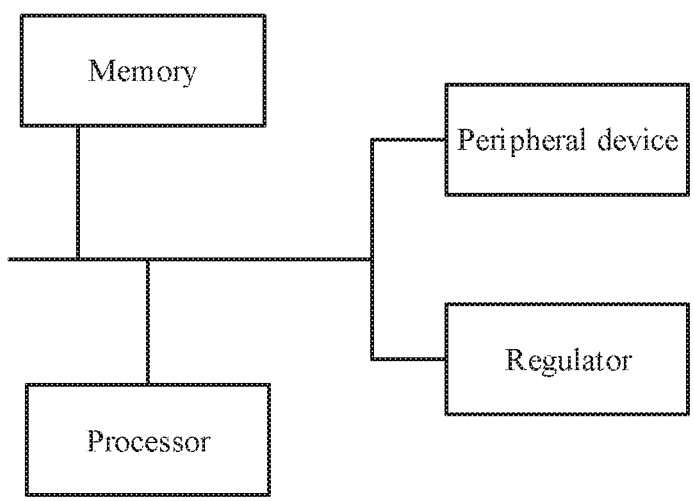
FIG. 3 is a schematic structure of a server according to a third embodiment of the present disclosure.

A third embodiment of the present disclosure relates to a server, as shown in FIG. 3, including: at least one processor; and a memory in communicative connection with the at least one processor; where the memory stores an instruction executable by the at least one processor, and the instruction is executed by the at least one processor to cause the at least one processor to perform the method for loading the web page in any one of the first embodiment to a fourth embodiment. Where, the memory and the processor are connected using a bus which may include interconnected buses and bridges of a random number. The bus connects various circuits of the one or more processors and the memory. The bus may further connect other circuits such as a peripheral device, a regulator, a power management circuit, and the like, which are commonly known in the art. Therefore, no further description is provided herein. A bus interface provides an interface between the bus and a transceiver which may be either an element or a plurality of elements, for example, a plurality of receivers and transmitters, providing units to communicate with various other devices on a transmission medium. Data processed by the processor may be transmitted on a wireless medium through an antenna. Further, the antenna may further receive data and transmit the data to the processor.

The processor manages the bus and general processing, and may provide various functions such as timing, a peripheral interface, voltage adjustment, power management and other control functions. The memory may be configured to store data used by the processor during operation.

Figure 4:
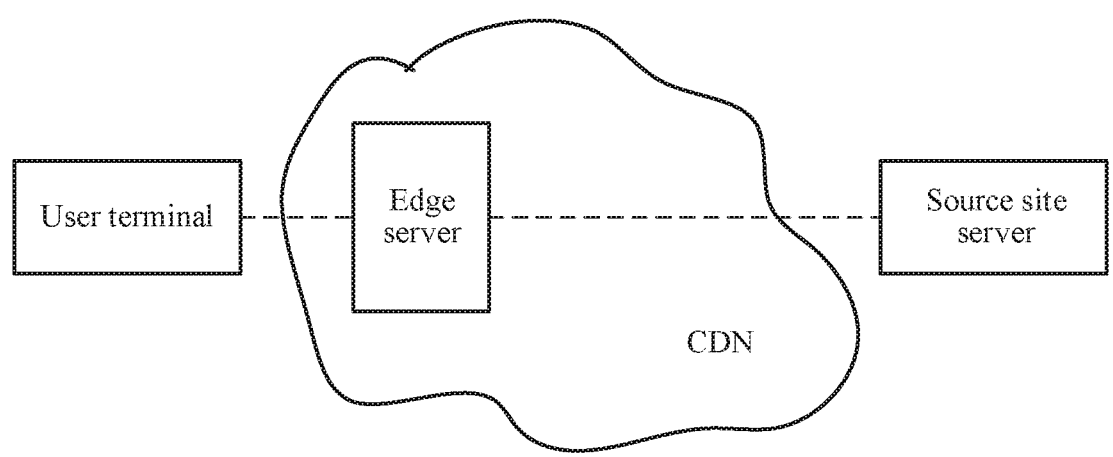
FIG. 4 is a schematic structure of a system for loading a web page according to a fourth embodiment of the present disclosure.

A fourth embodiment of the present disclosure relates to a system for loading a web page, as shown in FIG. 4, including: a user terminal and a server mentioned in the third embodiment, where the server may be an edge server under a CDN architecture. In practice, the system for loading the web page in this embodiment may further include an origin site server to which a web page to be loaded belongs.

A fifth embodiment relates to a computer readable storage medium, storing a computer program which, when executed by a processor, performs the method embodiments described above.

That is, those skilled in the art may understand that all or some steps of the embodiment methods described above may be completed by a program instructing a relevant hardware. The program is stored in a storage medium and includes several instructions for enabling one device (which may be a chip microcomputer, a chip and the like) or a processor to perform all or some steps of the respective embodiment methods of the present disclosure. The storage medium described above may be a medium (such as a U-disk, a mobile hard disk, a read-only memory (ROM), a random access memory (RAM), a disk or a disc) that may store program codes.

Those skilled in the art may understand that the embodiments described above are specific embodiments for implementing the present invention. However, in practice, many changes can be made in the forms and details of the present disclosure without departing from the spirit and scope of the invention.

What is claimed is:

1. A method for loading a web page, applied to an edge server of a content delivery network, comprising:
    obtaining a loading list corresponding to a page according to a page loading request when the page loading request is received from a user terminal, and the loading list comprises several add-ins to be loaded and a loading sequence of the several add-ins;
    identifying a resource to be accelerated from the several add-ins to be loaded;
    rewriting the resource to be accelerated in the loading list, including:
        rewriting, if the resource to be accelerated is a third-party script file, a loading sequence of the third-party script file in the loading list by creating a script element dynamically and adding the script element to an end of an HTML file through a document object model (DOM) such that the third-party script file is ignored when loading add-ins in the loading list, and is executed after add-ins other than the third-party script file in the loading list are loaded;
        adding identification information to a specific position of a request address corresponding to the resource to be accelerated if the resource to be accelerated belongs to a third-party external link;
        adding a stop identifier to a specific position of a request address corresponding to the resource to be accelerated if the resource to be accelerated belongs to a preset blacklist; and
    feeding back the loading list that is rewritten to the user terminal for the user terminal to request each add-in to be loaded on the loading list to perform a page loading.

2. The method for loading the web page according to claim 1 wherein it is determined through domain name identification that the resource to be accelerated belongs to the third-party external link.

3. The method for loading the web page according to claim 1, wherein the preset strategy is configured by the customer.

4. The method for loading the web page according to claim 1, after feeding back the loading list that is rewritten to the user terminal, further comprising:
    receiving the loading request for each add-in to be loaded from the user terminal, and sending the loading request to a target site; wherein, a preferred network node is used to send the loading request for the resource to be accelerated that contains the identification information if the loading request that is received comprises the identification information.

5. The method for loading the web page according to claim 4, wherein the identification information is customer identification information.

6. The method for loading the web page according to claim 1,
    after feeding back the loading list that is rewritten to the user terminal, further comprising:
    receiving the loading request for each add-in to be loaded from the user terminal, and sending the loading request to a target site; wherein, a stop-loading instruction for the resource to be accelerated that contains the stop identifier is returned if the loading request that is received comprises the stop identifier.

7. The method for loading the web page according to claim 1, further comprising: locally storing the loading list when the loading list corresponding to the page is obtained according to the loading request.

8. The method for loading the web page according to claim 1, before identifying the resource to be accelerated from the add-ins to be loaded, further comprising:
    determining whether to use an optimization service, and performing the step of identifying the resource to be accelerated from the add-ins to be loaded when it is determined to use the optimization service.

9. The method for loading the web page according to claim 8, wherein it is determined whether to use an optimization service according to a request address in the page loading request.

10. The method for loading the web page according to claim 4, wherein sending the loading request to the target site comprises: monitoring an IP and port information; determining both of an IP of an origin site and a port of the origin site; and determining an optimal path between the user terminal and the origin site through an intelligent routing device.

11. A server, comprising:
at least one processor; and
a memory in communicative connection with the at least one processor; wherein,
the memory stores an instruction executable by the at least one processor, and the instruction is executed by the at least one processor to cause the at least one processor to perform a method for loading a web page; wherein the method comprises:
obtaining a loading list corresponding to a page according to a page loading request when the page loading request is received from a user terminal, and the loading list comprises several add-ins to be loaded and a loading sequence of the several add-ins;
identifying a resource to be accelerated from the several add-ins to be loaded;
rewriting the resource to be accelerated in the loading list, including:
rewriting, if the resource to be accelerated is a third-party script file, a loading sequence of the third-party script file in the loading list by creating a script element dynamically and adding the script element to an end of an HTML file through a document object model (DOM) such that the third-party script file is ignored when loading add-ins in the loading list, and is executed after add-ins other than the third-party script file in the loading list are loaded;
adding identification information to a specific position of a request address corresponding to the resource to be accelerated if the resource to be accelerated belongs to a third-party external link;
adding a stop identifier to a specific position of a request address corresponding to the resource to be accelerated if the resource to be accelerated belongs to a preset blacklist; and
feeding back the loading list that is rewritten to the user terminal for the user terminal to request each add-in to be loaded on the loading list to perform a page loading.

12. The server according to claim 11, wherein it is determined through domain name identification that the resource to be accelerated belongs to the third-party external link.

13. The server according to claim 11, wherein the preset strategy is configured by the customer.

14. A system for loading a web page, comprising: a user terminal and a server;
wherein the server comprises:
at least one processor; and
a memory in communicative connection with the at least one processor; wherein,
the memory stores an instruction executable by the at least one processor, and the instruction is executed by the at least one processor to cause the at least one processor to perform a method for loading a web page; wherein the method comprises:
obtaining a loading list corresponding to a page according to a page loading request when the page loading request is received from a user terminal, and the loading list comprises several add-ins to be loaded and a loading sequence of the several add-ins;
identifying a resource to be accelerated from the several add-ins to be loaded;
rewriting the resource to be accelerated in the loading list, including:
rewriting, if the resource to be accelerated is a third-party script file, a loading sequence of the third-party script file in the loading list by creating a script element dynamically and adding the script element to an end of an HTML file through a document object model (DOM) such that the third-party script file is ignored when loading add-ins in the loading list, and is executed after add-ins other than the third-party script file in the loading list are loaded;
adding identification information to a specific position of a request address corresponding to the resource to be accelerated if a link of the resource to be accelerated belongs to a third-party external link;
adding a stop identifier to a specific position of a request address corresponding to the resource to be accelerated if the resource to be accelerated belongs to a preset blacklist; and
feeding back the loading list that is rewritten to the user terminal for the user terminal to request each add-in to be loaded on the loading list to perform a page loading.

\* \* \* \* \*